Nov. 7, 1967　　　O. E. ALBERTSON ETAL　　　3,351,030
TREATMENT AND INCINERATION OF WASTE SLUDGES
Original Filed July 10, 1961　　　　　　　　　　7 Sheets-Sheet 1

INVENTORS:
ORRIS E. ALBERTSON
WILLIAM E. BUDD
By: Theodore M. Jablon
Att'y

INVENTORS:
ORRIS E. ALBERTSON
WILLIAM E. BUDD
By: Theodore H. Jablon
Att'y

INVENTORS:
ORRIS E. ALBERTSON
WILLIAM E. BUDD
By: Theodore L. Jablon
Att'y

Fig. 7

INVENTORS:
ORRIS E. ALBERTSON
WILLIAM E. BUDD
By: Theodore M. Jablon
Att'y 3,351,030
TREATMENT AND INCINERATION OF
WASTE SLUDGES Orris E. Albertson, Norwalk, and William E. Budd, Ridgefield, Conn., assignors to Dorr-Oliver Incorporated, Stamford, Conn., a corporation of Delaware
Continuation of application Ser. No. 429,975, Feb. 3, 1965, which is a division of application Ser. No. 131,455, July 10, 1961, now Patent No. 3,319,586. This application May 18, 1966, Ser. No. 556,533
5 Claims. (Cl. 110—8)

This is a continuation of application 429,975 filed Feb. 3, 1965, now abandoned, which in turn is a division, carved out of U.S. application No. 131,455 filed July 10, 1961, by Orris E. Albertson and William E. Budd for "Improvements in the Treatment and Disposal of Waste Sludges," now Patent No. 3,319,586.

This invention relates to improvements in the disposal of sewage sludges or the like, and more particularly to improvements pertaining to the destruction of the organic sludge solids by complete combustion.

The invention aims to provide a greatly simplified system and apparatus for combustion of waste sludge, particularly sludge resulting from sedimentation, which eliminates the need for a separate drying operation and its accessories, along with reduced expenditures for extra fuel, power, and required maintenance.

More particularly, the invention is concerned with apparatus for mechanically producing a dewatered sludge cake and for feeding said cake into a heated fluidized solids combustion bed of inert material so as to produce complete odorless combustion with a minimum amount of added fuel or no added fuel whatever, depending on the type and solids content of the sludge.

The foregoing objects are attained, according to the invention, by providing apparatus for the combustion of the moist raw sludge in a bed of inert hot granular material maintained in a state of fluidization which is the formation of a dense and turbulent suspension of particles in an upflowing stream of treatment gas, the turbulent suspension of solids being commonly referred to as a turbulent layer or fluidized bed. Combustion thus conducted under the conditions of the invention will reduce the organic solids in the moist sludge to stable gaseous products, with a large portion of the heat liberated by the combustion of the sludge while also heating the combustion gases to the bed temperatures ensuring complete odorless combustion.

Further objects are to solve the problem of removal of ash from the combustion chamber by providing a fluidized combustion bed which comminutes the ash and strips them from the bed along with the combustion gases to automatically remove ash.

Another object is to provide apparatus for feeding dewatered sludge which compacts the sludge and feeds it in such a position with respect to the bed that the compacted sludge will remain within the bed and will burn as completely as possible within the bed and at the controlled bed temperature rather than float to the surface of the bed to burn in the freeboard at a higher uncontrolled and therefore wasteful temperature. In so feeding the compacted sludge to the bed it is an object of the invention to seal the combustion chamber against escape of pressure and of combustion gas.

Still another object is to mechanically dewater the sludge resulting from sedimentation and feed it directly into the body of the fluidized bed without the odor problems and capital expense of evaporating devices.

The invention further comprises operating controls which may be automatic, whereby efficient and complete as well as odorless combustion is assured in spite of fluctuations in the volatile or combustible solids loading rate or in the moisture content of the dewatered sludge.

Some of the embodiments of the invention concern arrangements whereby prepared mixtures of raw primary sludge and aerobically treated secondary sludge are subjected to the above kind of combustion operation.

Other features and advantages will hereinafter appear.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the metes and bounds of the claims, or equivalents of such metes and bounds, are therefore intended to be embraced by the claims.

Figure 6:
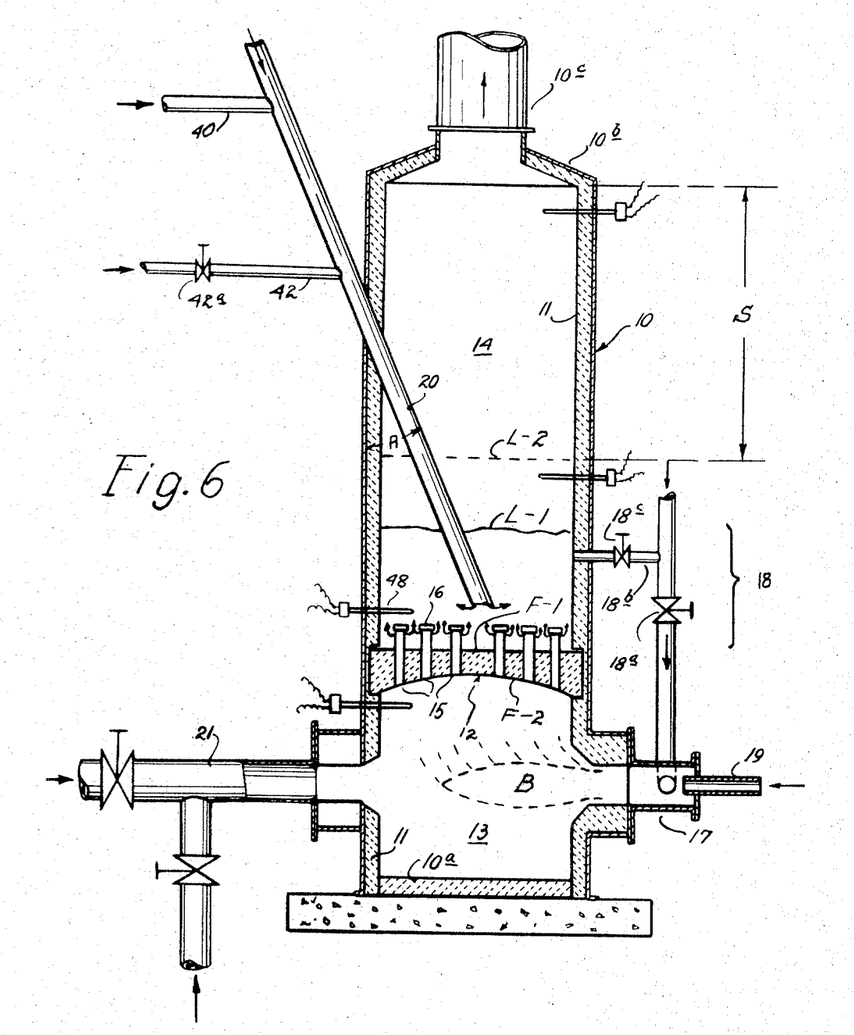
FIG. 6 shows a greatly enlarged vertical section of an example of the combustion unit, containing the bed of fluidized materials.

The combustion unit itself according to the example in FIG. 6 is in the nature of a cylindrical steel vessel or vertical shell 10 which has a flat bottom 10a and a conical top 10b provided with a stack connection 10c, the whole vessel being provided with a lining of suitable refractory material 11. A construction plate 12 preferably of suitable refractory material divides the vessel or tower into a windbox 12 below to which fluidizing gases are supplied, and a combustion chamber 14 above the constriction plate for the combustion to be carried out therein of the aforementioned moist organic sludge. The constriction plate constitutes an air permeable support and may be of monolithic refractory construction or it may be composed of shaped refractory bricks constituting a self-sustaining arch construction defined by a horizontal face F–1 at the top and a concave bottom surface F–2. Holes 15 are regularly spaced in the constriction plate to insure an even distribution of the fluidizing gas or combustion air from the windbox over the entire cross-section of the combustion chamber. Bubble cap devices 16 associated with respective passages 15 in the constriction plate prevent the escape of any solids from the combustion chamber down through the constriction plate.

For the purposes of this invention, the combination chamber contains a more or less permanent charge or body of an auxiliary inert granular material having heat storing and heat radiating capability. Sand, for example, may be employed for this purpose if graded to suit the present fluidizing operation in accordance with the requirements of the invention further to be explained below. L–1 designates the level of this body of inert material when subsided and the sand particles are at rest, whereas L–2 designates the bed or bed level or upper surface with freeboard space S above, when this body of material is expanded or in a fluidized state due to the effect of fluidizing gases or combustion air forced upwardly from the windbox through the constriction plate.

The windbox has an auxiliary fuel burner 17 which may be operated for starting up the sludge combustion operation.

With the aid of this burner the inert granular material of sand is first brought up to a required operating temperature, auxiliary fuel being supplied from pipe 18 via control valve 18a to the burner which also has a pipe 19 for supplying the combustion air. Thus, preparatory to the sludge combustion proper, the windbox itself becomes initially a combustion chamber as indicated by the burner flame B, with sufficient pressure maintained within the windbox to force the resulting hot combustion gases through the constriction plate and through the bubble cap devices, to maintain the sand as an expanded fluidized bed while heating the same to the desired temperature, with spent heating and fluidizing gases escaping through the stack. In case of need, when the fuel value of the sludge is insufficient to sustain combustion, auxiliary fuel may be injected directly into the fluidized bed, as indicated by the branch pipe 18b provided with control valve 18c.

Once the bed of fluidized inert material has reached the desired operating temperature, the supply of specially prepared moist sludge into the bed of hot turbulent sand particles may be started through a sludge supply pipe 20 preferably arranged so as to intersect at a steep angle "A" with the cylindrical wall of the combustion unit and terminating in the central region of the bottom strata or lower half of the bed. This is so that the sludge, which is lighter than the sand bed, will stay in the bed long enough to burn and vaporize without floating on top of the bed in the freeboard where temperatures will be higher and uncontrolled. In the case of larger units, however, a plurality of such supply pipes may be arranged in spaced relationship with one another around the vertical axis of the unit, and with their discharge ends accordingly located radially outwardly from the axis of the unit.

Under preferred operating conditions of the invention the auxiliary fuel supply to the burner may then be discontinued, in order that combustion air alone be supplied to the windbox 13 as through a supply pipe 21, in order to support autogenous combustion of the moist oxidizable organic sludge matter introduced into the fluidized bed.

Figure 5:
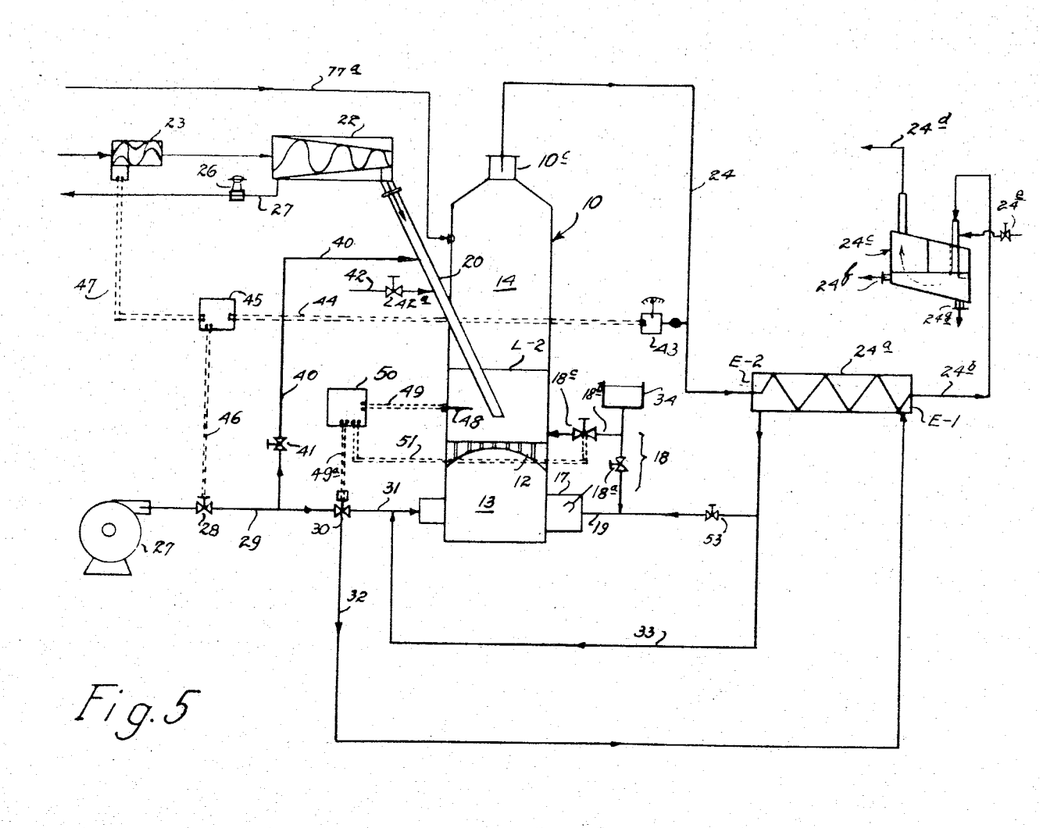
FIG. 5 shows a portion of the flowsheet common to FIGS. 1, 2, and 3, somewhat enlarged, illustrating automatic combustion control.

Combustion controls to satisfy the requirements of sludge/air ratio and combustion temperature, are exemplified diagrammatically in the apparatus arrangement or combustion system illustrated in FIG. 5. Accordingly, the combustion unit 10 has the sludge supply pipe 20 leading for example from a dewatering device such as a solid bowl type centrifuge 22 (to be furthermore described below) delivering feed sludge of suitable moisture content or organic solids concentration into the hot fluidized bed of sand maintained in the combustion chamber. A metering pump 23, for instance of the Moyno type, provides a continuous uniform volume of sludge into the centrifuge at say 5% to 12% total solids concentration to be further increased in the operation of the centrifuge to a range substantially of 23% to 40%. The pump then acts as a sealing device capable of delivering an adjusted or metered volume of sludge against a pressure maintained in the closed housing of the centrifuge, which in turn communicates under pressure with the combustion chamber through the inclined supply pipe 20, with adequate pressure being maintained in the combustion unit at least sufficient to offset any subsequent pressure drop encountered by the combustion gases passing through a flue duct or pipe 24 to the preheater 24a and from there through a pipe 24b to a dust or ash scrubber 24c, then to be released into the atmosphere at 24d. Scrubbing water supply for this unit is indicated at 24e while an overflow and ash discharge means for discharging sludge ash is carried from the bed by the fluidizing air, are indicated at 24f and 24g respectively.

Figure 3:
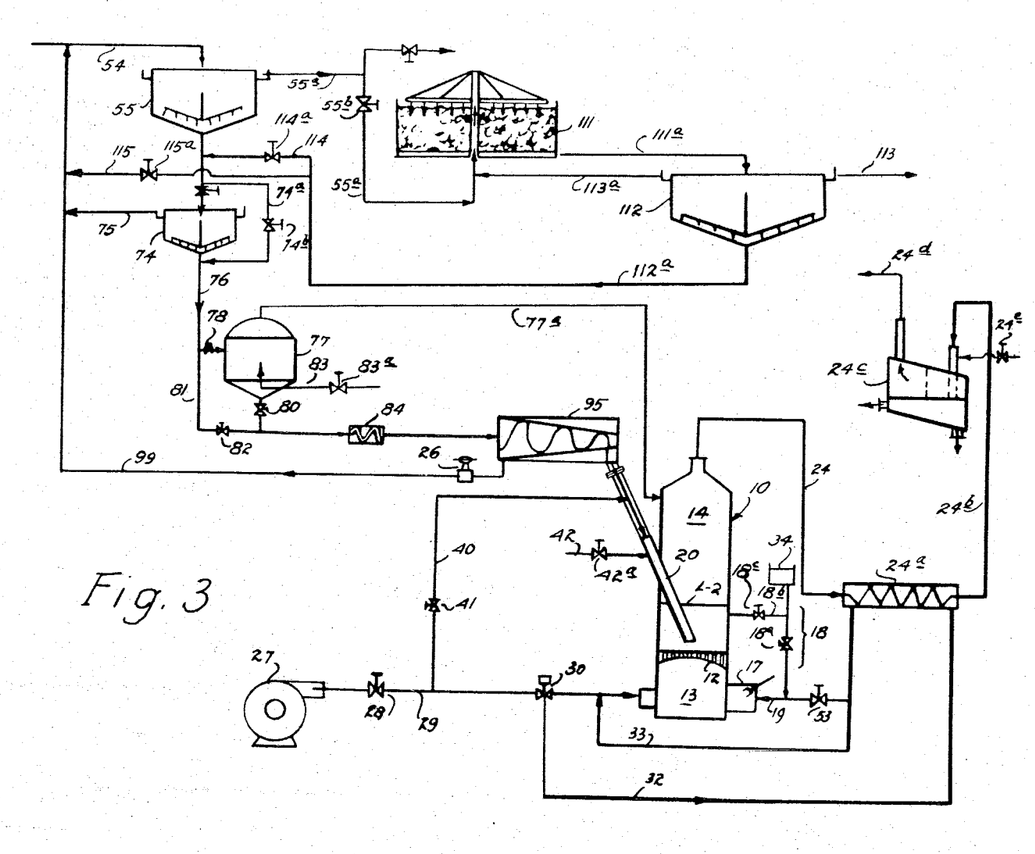
FIG. 3 is still another complete treatment flowsheet modifying the flowsheet of FIG. 1, by employing a trickling filter and a centrifuge.
Figure 4:
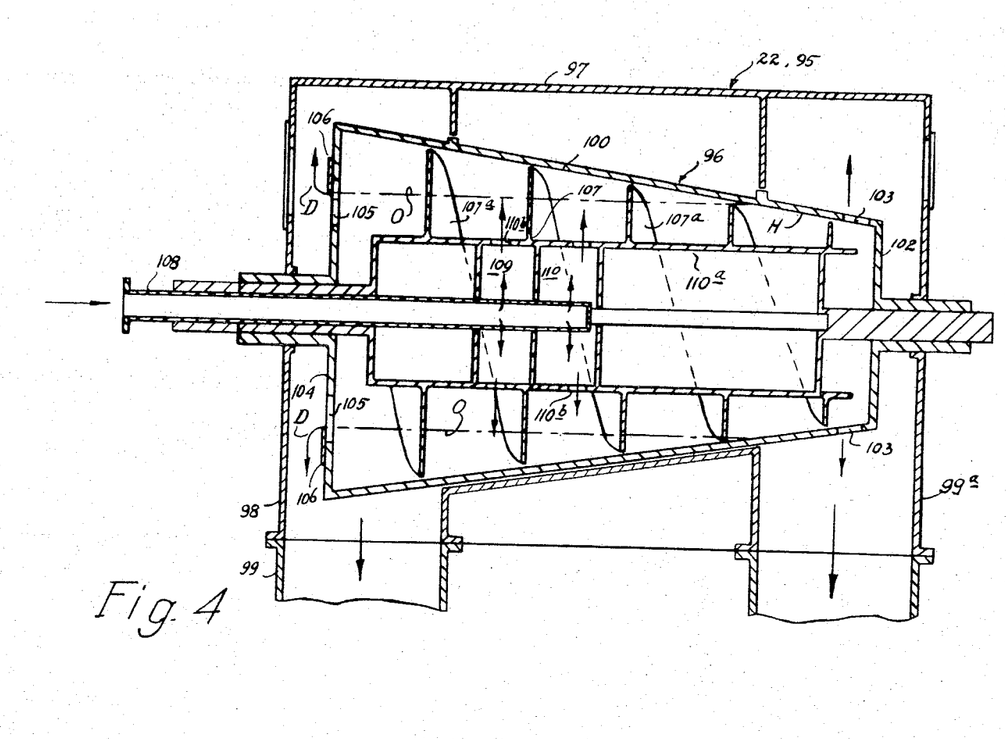
FIG. 4 illustrates diagrammatically the type of centrifugal machine employed for sludge concentration in the flowsheets of FIGS. 2 and 3.

A semi-diagrammatic example of the centrifugal machine enclosed and constructed for the aforementioned pressure operation is shown in FIG. 4 to be further described in more detail in connection with its embodiment in treatment systems shown in FIGS. 2 and 3 embodying the above described combustion phase of the invention. Because of the internal pressure to be maintained in this centrifugal machine, the separated liquid fraction discharges into the atmosphere by way of a suitable differential pressure valve 26 provided in the respective discharge line 27 (see FIG. 5) of the centrifuge.

A low pressure blower 27a provides the combustion air for the operation of the fluidized bed, having a main discharge control valve 28 provided in the supply line 29 leading from the blower to a proportional three-way valve 30 which has one delivery branch 31 leading to the windbox 13 of the combustion unit and another delivery branch 32 leading to the end E–1 of gas-to-gas type heat exchanger 24a which in turn has a discharge pipe at the opposite end E–2 for carrying the preheated combustion air to join and mix with the non-heated portion of the combustion air in the aforementioned branch pipe 31. Thus, in accordance with the setting of the proportional three-way valve 30, only a portion of the combustion air from the blower is delivered directly through branch 31 into the windbox 13, while the balance is diverted through branch 32, the preheater 24 and pipe 33, to mix with the unpreheated portion of the combustion air.

Under practical conditions, assuming an average stack gas temperature of about 1400° F. at the inlet end of the heat exchanger, and a discharge gas temperature of about 900° F. at the outlet end, adequate air preheating for the purpose of this invention is attainable with an average temperature differential of about 200° F. between the two gaseous media passing countercurrently therethrough.

In case of need, auxiliary fuel of either the liquid or the gaseous type may be admitted from the container or supply station 34 through pipes 18 and 18b via control valve 18c directly into the fluidized bed, to help sustain the combustion. For start-up purposes, control valve 18a may admit such fuel to the auxiliary burner 17, with combustion air preferably preheated by the combustion gases for shortening the starting period and to minimize the amount of start-up fuel needed.

The sludge supply pipe 20 through which the sludge is forced by the centrifuge pressure has carrier air supplied thereto through branch pipe 40 leading from the blower and provided with control valve 41. A separate high pressure purge air connection 42 with control valve 42a is provided to relieve clogging in the pipe.

Control of the combustion operation for the purposes of this invention is attainable manually or semi-automatically, or it may be fully automatic.

In case of full automatic operation as herein illustrated, a gas analyzer 43 may be connected to the flue or stack gas conduit 24 to monitor and to initiate the control of the sludge/air ratio by furnishing current indications of the $O_2$-content of the combustion gases thus providing a criterion of the completeness and efficiency of the combustion. These $O_2$ indications from the gas analyzer may be relayed electrically as indicated by dotted line control connections 44 to a first control station 45 which in turn translates them into corresponding control operations regulating either the main air supply valve 28 as indicated by dotted line control connections 46 while holding the sludge supply from the pump 23 at a constant rate, or vice versa regulating the sludge supply by adjustment of the metering pump 23 as indicated by the dotted line control connections 47 while holding the air supply from the blower at a constant rate. These modes of controlling the sludge-air ratio may be employed either individually or jointly to ensure complete combustion of the oxidizable organic matter in the sludge. In this way, any changes in the volatile solids content in the sludge, that is the solids concentration, is compensated for, so that complete combustion is ensured and may be carried out with a predetermined practical minimum of air consumption.

However, in order to ensure that the combustion gases be inoffensive and non-odorous, monitoring and control of the combustion temperature must proceed simultaneously with and complementary to the above described sludge/air ratio control. Therefore, temperature control is initiated in this example by a thermo-couple 48 extending into the combustion chamber, the temperature responses of which are transmitted electrically as indicated by dotted line control connections 49 to a second control station 50 which in turn converts them into corresponding control effects with respect to setting the proportional three-way valve 30 thereby regulating that proportion of the combustion air from the main supply valve 28 that is diverted through pipe 32 to be preheated by the combustion gases in the heat exchanger 24a.

The operation of the second control station 50 for monitoring the combustion temperature is adjusted in such a manner that the temperature will not be allowed normally to fall below a predetermined minimum, being held to a suitable average value of, say, 1400° F. In the case of various moist sewage sludges a practical temperature range is from about 1200° to 1600° F., since that will ensure non-odorous combustion while minimizing wear and tear on the refractory lining of the combustion unit. Under these conditions, if the solids concentration of sludge entering the combustion chamber is sufficiently high, the temperature control station 50 will operate so as to direct all of the required combustion air into the windbox 13, with none of the air bypassing through the heat exchanger. However, should the sludge solids concentration fall exceptionally low where even a 100% air preheating operation would not suffice for sustaining desired minimum combustion temperatures, then the temperature control station may operate to initiate the injection into the fluidized bed of an auxiliary fuel as from supply station 34, by automatically actuating the fuel valve 18a as indicated by the dotted line control connections 51. But, when the solids concentration and thus the temperature again rises, the response of the control station 50 will be such as to discontinue the auxiliary fuel supply and again to rely on controlling the operation of the preheat proportioning valve 30 for effective temperature control.

In order that the combustion unit may be started cold, auxiliary fuel for the auxiliary burner 17 may be drawn from the supply station 34 at a rate controlled by valve 18a, with the proportional valve 30 then directing all of the combustion air at least initially through the heat exchanger 24a and with at least part of the preheated air directed to the fuel burner as by the operation of a valve 53.

In practicing the invention, it is among the advantages that gritty particles or sand normally present in the sewage, need not be removed as by means of a degritting operation such as employed in conventional treatment systems. Instead, the sand or the like being carried through all of the above described conditioning operations, may finally join the fluidized bed of sand maintained in the combustion zone. Therefore, sand particles in the ash material resulting from combustion of the sludge that may become disintegrated by abrasion in the course of operation and are carried away with the combustion gases for interception by the scrubber, are thus replaced by sand particles and ash material introduced together with the sludge. In this way, the sand bed may become at least partially self-supplying and self-grading.

This comminuting and entrainment or stripping of the ash left from combustion of the sludge, solves one of the serious problems of conventional incineration, requiring hand removal or special mechanical equipment to remove the ashes and clinkers. Applicants get ash removal free by reason of the comminuting and entrainment resulting from the fluidizing combustion air passing through the bed.

Figures 1, 1A:
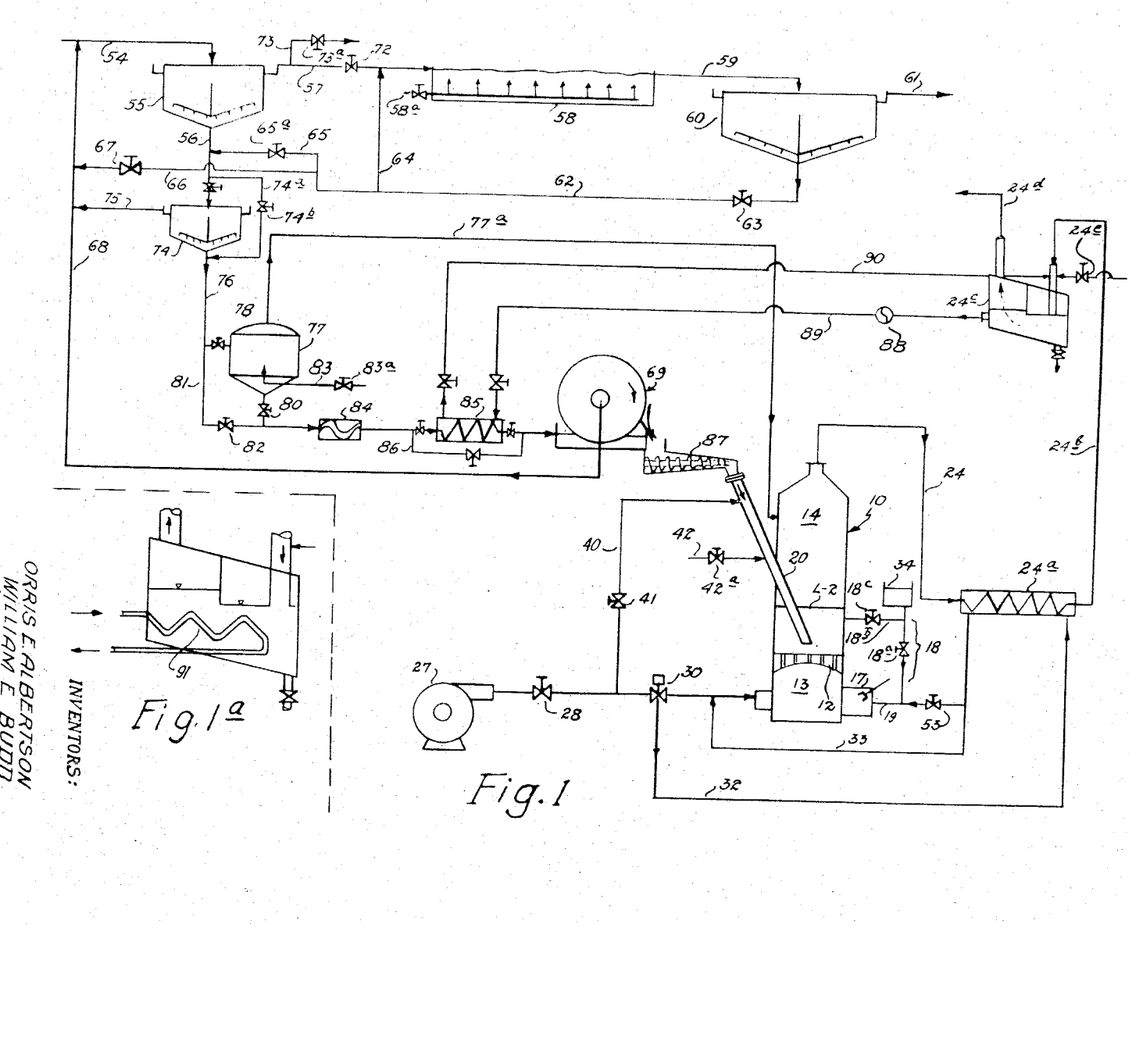
FIG. 1 is a complete treatment flowsheet, with a combination of a sewage sludge thickener and continuous filter delivering a mixture of primary and activated sludge dewatered for use in the combustion operation, including air-preheating and sludge-preheating means.
FIG. 1a is an enlarged detail view of the sludge preheating means included in the flowsheet of FIG. 1.
Figure 2:
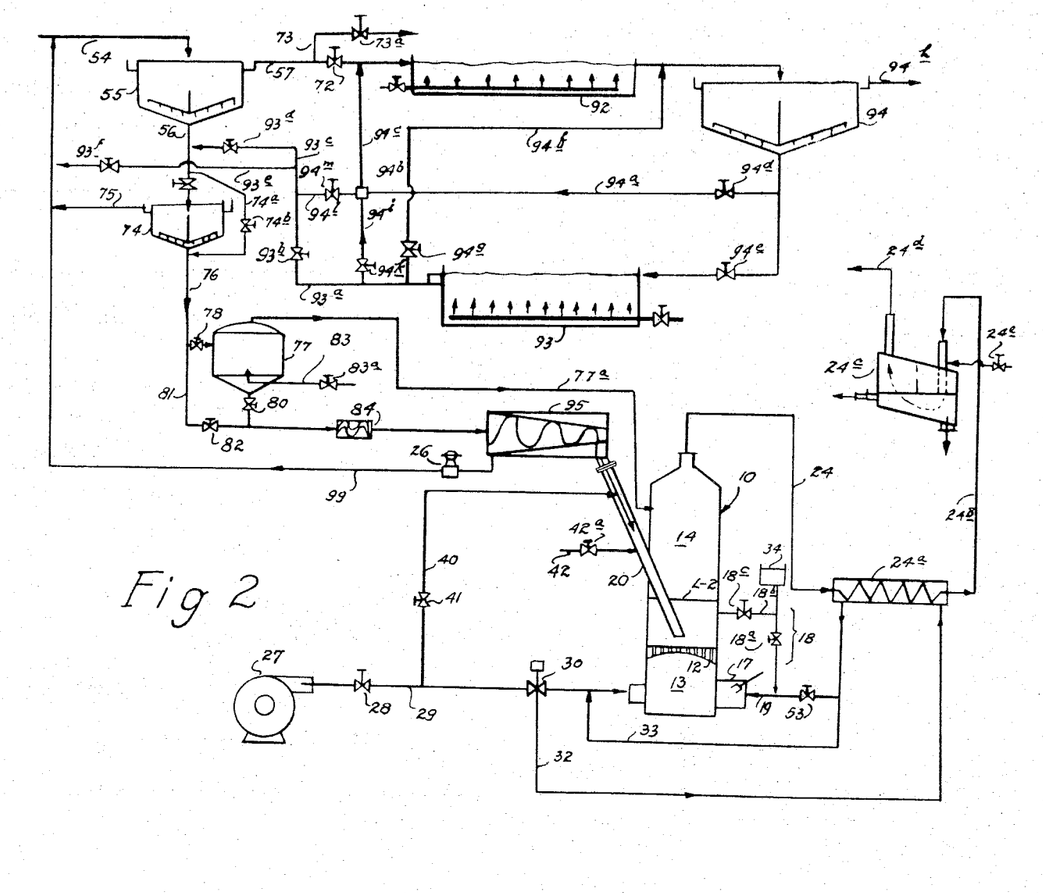
FIG. 2 is another complete treatment flowsheet modifying the flowsheet of FIG. 1 by the inclusion of an auxiliary oxidation station and the use of a centrifuge instead of the filter.

The treatment systems exemplified in FIGS. 1, 2, 3 illustrate ways in which putrescible mixed sewage sludges may be conditioned for the purposes of this invention, mixed sludges being understood to be those mixtures which combine raw primary sedimentation sludge with secondary sludge resulting from the aerobic treatment of the primary clarifier effluent. In view of the fact that secondary sludges and therefore the mixed sludges offer relatively high resistance to organic solids concentration as compared with that of raw primary sludge alone, the following treatment systems according to FIGS. 1, 2, and 3 provide ways in which such mixed sludges may be concentrated effectively to the extent required by the above described specially conducted combustion operation. Each of these treatment systems involves first the thickening of the thin mixed sludge and then subjecting the thickened sludge to further concentration as by a continuous vacuum drum filter or by a suitable centrifugal machine as the case may be in view of the respective characteristics of the mixed sludges predicated upon the kind of secondary treatment used.

In connection with this invention, either raw primary sludge alone or mixed sludges can be thickened effectively for instance if the thickening operation is conducted and controlled in accordance with the teaching of Patent No. 2,850,449 issued Sept. 2, 1958, to Wilbur N. Torpey and further discussed below, whereby concentrations of raw primary sludge alone are attainable to the extent of about 9% to 12% total solids, while mixed sludges may be concentrated to about 5% to 9%, more or less. At any rate, this controlled thickening operation will furnish mixed thickened sludges best suited for additional concentration as above indicated by mechanical dewatering, for example either by continuous vacuum filter operation or in the centrifugal machine, as the case may be.

Mechanical dewatering as herein used is intended to refer to the forced or pressure removal of water as for example by vacuum filtration or by centrifuging.

There are instances where the inclusion of the thickener may not be necessary. For example, in the smaller treatment plants where the rate of solids supply in the sludge is small relative to the capacity of the centrifuge, the thickener may be omitted without adversely affecting the overall performance of the disposal system of this invention, while relying upon the centrifuge to produce the required sludge concentration at a high degree of solids capture.

Referring to the treatment system of FIG. 1, a supply line 54 delivers raw sewage into a primary clarifier tank 55 which in turn delivers the so-called primary sludge passing through underflow line 56 to be prepared for further concentration. An overflow line 57 delivers primary effluent containing the suspended sewage solids from tank 55 for further separation in an aerobic treatment station. The aerobic treatment in this embodiment is represented by an aeration tank 58 with air distributing equipment indicated at 58a, the operation of which may be controlled in the well known manner of an activated sludge treatment system effective to convert the suspended and the soluble organic sewage solids into settleable biologic flocs. A transfer conduit 59 delivers the floc laden liquid from the aerobic treatment tank to a conventional secondary final clarifier tank 60 which in turn delivers clarified and purified overflow indicated at 61. The secondary underflow or activated sludge containing the settled biologic flocs discharges through an underflow line 62 by way of a control valve 63, having a solids concentration usually in a range of about ½% to 2%.

The secondary underflow line 62 has a branch 64 through which this underflow is recirculated to the head end of the treatment tank at suitably controlled rates for properly sustaining the biologic activity in the tank for continued biologic floc formation. Also, the secondary underflow line 62 may have a waste discharge connection 17 provided with a control or shut-off valve 71.

The primary overflow line 57 is equipped with a control and shut-off valve 72 whereby the aerobic treatment section may be disconnected, and has a waste connection 73 provided with a valve 73a whereby the primary overflow may be diverted. Waste sludge from the secondary tank 60 may join the primary underflow line 56 to provide the aforementioned mixed sludges for further concentration, or it may mix with the return flow of the filtrate liquor carried by line 68 and then with the raw sewage for retreatment through the primary tank, or else the two courses may be used in combination.

The resulting mixed sludge is then subjected preferably first to a thickening operation as in a thickening tank or thickener 74. The operation is preferably conducted in accordance with the teachings of the above-mentioned patent to Torpey No. 2,850,449 summarized directly below, which makes it possible to consistently produce a relatively highly concentrated raw sludge either primary or mixed, and finally for combustion in the fluidized bed. Primary sludge total solids concentrations are thus attainable in the order of 9% to 12%, while mixed sludge concentrations thus attainable may be in the order of 5% to 9%. Effluent from the thickening tank 74 may be returned to the clarifier 55 through effluent line 75 leading into the filtrate return line 68 which in turn leads to the raw sewage supply line 54 delivering into the primary clarifier 55.

The thus thickened sludge from tank 74 according to this embodiment is then subjected to further concentration as on filter 69 delivering a filter cake material which may have the aforementioned solids concentration of about 23% to 40%.

The filtrate liquor from this filtration operation may be returned through the aforementioned conduit 68 into the raw sewage supply and thus into the primary tank 55.

More particularly for practical purposes, in the embodiment of FIG. 1 a transfer conduit 76 delivers the specially thickened mixed sludge to a holding tank 77 which may have a capacity of 2 to 3 days mixed sludge supply. The inlet to this holding tank has a control valve 78, while the outlet has a control valve 80, so that the tank may be by-passed as through a bypass connection 81 provided with a control valve 82. The holding tank 77 in this example is equipped with compressed air agitating means indicated by pressure air supply 83 controllable by a valve 83a. In this way, mixed thickened sludge may be supplied either from the holding tank or directly from the thickener 74 or from both, to a pump 84 which may be of the metering type such as a Moyno pump for feeding the thickened sludge mixture through a liquid-to-liquid type of heat exchanger 85 or through a bypass 86, or else through both, to the aforementioned continuous vacuum filter 69. A vent pipe 77a connects the holding tank 77 with the freeboard space above the fluidized bed in the combustion unit 10, whereby any spent agitating air along with any gaseous constituents developed in the holding tank may be disposed of by combustion.

A conical screw feeder 87 of the pressure extrusion type is shown in this connection as a means for pumping the filter cake material through the restricted opening 87a in the small end of the cone 87b, serving to compact and extrude the cake material into the pipe or conduit 20 for feeding into the bed of hot fluidized material in the combustion unit 10 at a pressure and density which will seal against the escape of pressure and combustion gases from the combustion chamber.

It will be noted that the feed pipe 20 delivers compacted cake material into the fluidized bed at a location spaced inwardly from the combustion chamber walls and in the lower half of the fluidized bed for adequate distribution time, and contact with the fluidized bed for driving off steam and for combustion within the bed. The compacted nature of the sludge fed to the bed, and the fact that it is fed into the lower portion of the fluidized bed prevents the sludge, which is of lower density than the sand bed from floating to the surface of the bed before the sludge is burned as completely as possible within the bed. The advantage of this is that the burning occurs at the lower controlled temperature of the high heat capacity of the bed and thus does not waste heat raising steam and combustion products to higher and uncontrolled temperatures as would be the case if the sludge were burned in the freeboard at or above the surface of the bed.

After mechanical dewatering in the centrifuges 22 or 95 or the filter 69 the sludge is fed directly from the centrifuges or the worm feed 87 of the filter into the pipe or conduit 20 entering the fluidized bed, without any intermediate evaporation or drying with its attendant odor problems, and bulky air heating, moving and confining equipment, thus simplifying and rendering more compact the sludge disposal apparatus as a whole. Also as shown in FIGS. 2, 3 and 5 the sludge is completely enclosed against escape of odors from the time it is dewatered until it is completely burned in the combustion chamber.

Furthermore, featured by this invention is an arrangement wherein a pump 88 in a transfer line 89 supplies scrubbing water heated by the combustion gases of the aforementioned liquid-to-liquid heat exchanger 85 for countercurrently heating therein the thickened feed sludge preparatory to subjecting it to treatment on the filter 69, with spent scrubbing water returning through pipe 90 to the scrubber unit 24c. Yet, by way of modification (see detail FIG. 1a) pipe coils 91 carrying the thickened feed sludge are located directly in the hot scrubbing water reservoir in the scrubber unit proper, in which case a pump will deliver thickened sludge to the scrubber, while heated sludge returns to facilitate the filter operation. To the extent that the treatment system of FIG. 2 resembles that of FIG. 1, like parts of the equipment are all designated by like numerals. Such resemblance is found in a provision of the primary clarifier 55, the thickener 74, the holding tank 77 for thickened sludge, the metering or Moyno pump 84, and the combustion unit 10 with its accessories such as the blower 27 for the combustion air, the gas-to-gas heat exchange 24a controlled by the proportional three-way valve 30, the auxiliary fuel supply 34, and the fly ash scrubber unit 24c, as well as the control stations 45 and 50, all of which elements operate substantially in a combination as above described and are designated by the same numerals as the corresponding parts in FIG. 1.

A difference, however, is found in the arrangement of the aerobic or secondary treatment section, in that a conventional activated sludge aeration tank 92 is cooperatively associated with an auxiliary oxidation treatment tank 93, both being operatively connected to a secondary or final settling tank 94. In this way, by inducing aerobic digestion or destruction by auto-oxidation of a portion of the organic biologic flocs in the auxiliary tank 93 there is attainable a significant reduction in the total amount of organic solids in the secondary sludge, thus rendering the mixed sludge relatively more amenable to the subsequent solids concentration and thus more effectively treatable by centrifugal separating force. A centrifugal machine 95 is therefore shown to be employed in this embodiment instead of drum filter 69 of FIG. 1, which centrifuge may be similar in construction as well as operation to the one indicated at 22 in FIG. 5 and more particularly illustrated in the detail FIG. 4.

There are various ways of conducting the secondary treatment operation in this embodiment, even though all of them in some way require the recycle of activated sludge. In this instance, activated sludge is pumped as underflow from tank 94 as through pipe 94a, and then via junction 94b and pipe 94c back into the main aeration tank 92, the recycle rate being indicated by control valve 94d. In addition, in this example, excess activated sludge from tank 94 is diverted as through control valve 94e to the auxiliary oxidation tank 93 where a substantial portion of the organic sludge solids or flocs are destroyed by extended aeration. The resulting oxidized sludge may normally be transferred through conduit 93a as controlled by valve 93b either through the thickener 74 via branch 93c and control valve 93d, or to the primary clarifier 55 via branch 93e and control valve 93f, or both these branches may be used in conjunction with each other.

However, when indicated, part or all of the oxidized sludge from tank 93 may be transferred directly back into the final tank 94 via pipe 94f through control valve 94g. The advantage obtainable by routing the sludge in this way lies in the fact that the non-settleable high ash solids will pass into the overflow 94h of the final tank while the residual organic matter or flocs will settle in the tank whence they may be withdrawn for retreatment in the system as set forth above. In this way, a build-up of ash solids in the system is discouraged.

Moreover, there is provided a cross connection 94i leading from pipe 93a to junction 94b provided with control valve 94k operable to permit a portion or all of the oxidized sludge to be returned directly to the main aeration tank 92 via line 94c. A connection 94L with control valve 94m is provided so as to permit wasting activated sludge from the final tank either to the thickener 74 or to the primary clarifier 55.

The solid bowl type centrifugal machine herein exemplified in the treatment system of FIGS. 2 and 3, may be pressurized for purposes of this invention so that it may be operated as part of a pressure system, communicating through the feed pipe 20 with the interior of combustion unit 10. The machine as shown in FIG. 4 has a rotor structure 96 operating in a housing 97 which is sealed against the atmosphere. The housing has a discharge neck 98 delivering separated liquid, connected to the aforementioned differential pressure discharge valve 26 (see FIG. 3), with a return conduit 99 carrying the thus separated liquor from the centrifuge back into the primary settling tank 55 via the raw sewage supply line 54. The centrifugally separated solids fraction leaves the machine through a discharge neck 99a of the housing connected through the feed pipe 20 with the combustion unit 10.

The rotor structure 96 comprises a body portion or shell 100 of trunco-conical configuration. The narrow end of this shell is closed by end plate 102 at which the separated solids fraction may discharge centrifugally as through openings 103 provided in the adjacent narrow end portion of the shell. The wide end of this shell has a transverse end plate 104 provided with overflow openings 105 associated with adjustable weir plates 106 determining the line of overflow of separated liquid indicated by the arrow D and thus equally defining the volume of the annular centrifugal liquid body O.

Within the rotor shell there is in turn rotatably mounted a conically shaped flight conveyor element 107 rotated at a differential speed relative to the rotor shell, so that the flights 107a will move centrifugally separated solids from the liquid body O to emerge onto the narrow end portion or so-called beach portion H of the shell, and finally discharge centrifugally through the openings 103. Feed pulp enters this machine through an axially arranged feed tube 108 rotating with a conveyor element 107 and discharging feed material for example into receiving chambers 109 and 110 formed in the hollow hub portion 110a of the conical flight conveyor element, and then through openings 110b into the liquid body O undergoing centrifugal separation in this shell.

The treatment system according to the embodiment in FIG. 3, in turn, resembles the one described above in FIG. 2, and to the extent of that resemblance like parts will again be designated by like numerals. Such resemblance is found in all comparable respects including the solid bowl centrifugal machine just described and shown in FIG. 4, except for a change in the secondary treatment phase featuring the use of a trickling filter system that will produce a type of secondary sludge which in mixture with the primary sludge is relatively more amenable to centrifugal separation as compared with conventional activated sludge. By way of example, this secondary aerobic treatment system comprises a trickling filter unit 111 operating in circuit with a secondary settling and detention tank 112 eventually reaches the thickener 74 to be mixed with a primary sludge for example by way of the branch connections 114 and/or 115 through respective control valves 114a and 115a.

As here exemplified, this trickling filter receives effluent from the primary clarifier through effluent conduit 55a provided with control valve 55b and leading to the trickling filter 111 which operates to convert the organic solids into humus sludge. Effluent from the trickling filter is delivered through conduit 111a to the final tank 112 where the humus sludge will settle to be returned through underflow conduit 112a preferably to the thickener 74. However, during periods when the thickener 74 is out of operation, the secondary sludge from the final tank may be returned to the primary clarifier in order that mixed sludge may be routed via valve 74b to bypass conduit 74a to the centrifuge 95. This secondary treatment system requires that a portion of the final effluent 113 be continuously returned to the trickling filter 111 as by way of transfer conduit 113a.

Another applicable method of secondary treatment to provide suitable mixed sludges for the purposes of this invention is what is known as modified aeration, an intermediate type of activated sludge treatment effective to remove about 60%–70% of the B.O.D. in the raw sewage. The resulting sludge can then be concentrated by the above thickening operation of the Torpey patent to a much higher degree than mixed activated or mixed trickling filter sludge, thus lending itself readily to further dewatering by the action of a centrifuge.

Also applicable to all the foregoing embodiments is the provision of the storage tank 77 having a capacity from one to three days storage of thickened sludge allowing for shutdowns occurring for example during weekend periods or in emergencies. The contents of the storage tank is agitated periodically as by means of high pressure air of, say, 7 lbs. pressure, the agitation being applied with sufficient frequency to prevent solids segregation in this storage tank. This storage tank is closed so that any sludge gases together with the mixing air may be sent through pipe 77a for deodorizing by combustion into the freeboard space above the fluidized bed of the combustion unit where temperatures in the order of 1800° F. may be developed.

OPERATION

Starting and re-starting the combustion operation

After the combustion unit has been supplied with the charge of graded sand, the bed of fluidized particles must first be established and heated at least to the minimum operating temperature at which combustion of the volatile matter in the concentrated yet moist sludge may be ensured. To this end, from a cold condition of the combustion unit 10 (see FIGS. 5 and 6) the auxiliary burner 17 is started burning a suitable fuel, for example oil from the supply 34 to produce hot combustion gases in the windbox 13 underneath the constriction plate 12, effective to heat and fluidize the mass of inert sand particles above the constriction plate. Preferably, during this phase the rate at which combustion air from blower 27 is applied to the burner is such that the windbox temperature will not exceed temperatures of, say, 1800° F. to 2000° F., compatible with the heat tolerance of the windbox and of the constriction plate.

Combustion control

Once the operating temperature has been attained by the above starting or re-starting procedures, the sludge combustion operation requires control of the bed temperature and of the air/solids ratio concurrently to ensure complete and odorless combustion.

Hence, in the operation of the invention, indications of temperature changes derived for example from the thermo-couple 48 (see FIGS. 5 and 6) may be utilized for varying manually or automatically the proportion of the combustion air to be preheated by the stack gas in preheater 24a. For example, the thermo-couple 48 through control connection 49 may report any deviation in bed temperature to the automatic control or telemetry station 50 (see FIG. 5) which in turn through control connection 49a may initiate a corresponding opening or closing of the three-way proportioning valve 30 whereby correspondingly a larger or smaller proportion of the combustion air is sent through the preheater via conduits 32 and 33 into the windbox 13, thus maintaining the temperature at the desired operating level or within the desired operating range.

In case the bed temperature should fail to a point below the minimum required for non-odorous combustion, the control station 50 through control connection 51 may actuate valve 18c causing the injection of auxiliary fuel from tank 34 into the fluidized bed until at least the minimum operating temperature shall have been restored.

Again, this air/sludge solids control may be manual, of it may be semi- or fully automatic. A highly effective control of this ratio may be provided by constant monitoring of the oxygen content in the combustion gases, for instance by the stack gas analyzer 43 reporting the $O_2$ content of the stack gases to the automatic control or telemetry station 45 as through the control connection 44. This station in turn may initiate a corresponding change either in the rate of feed sludge delivery by pump 23 (see FIG. 5) as indicated by control connection 47, or else initiate a corresponding change in the rate of air supply from the blower through valve 28 as indicated by control connection 46, or both.

Heat storage characteristics of the fludized bed

While the above stated operating characteristics of the fluidized bed of inert materials or sand are the basis for attaining the combustion conditions called for by the invention, this material also tends to stabilize the combustion temperature because of its heat storing capacity. The inert material also provides sufficient heat storage for promptly restarting the combustion after a shutdown period.

Thus, the heat storage capacity of the sand is effective to resist combustion temperature changes attributable to fluctuations in any one or more of the operating factors set forth above that control the combustion operation, thereby rendering the bed self-stabilizing. Furthermore, such buffering effect of the material provides sufficient time delay for an operator to adjust the air supply rate or the rate of solids feed or both, after an alarm or the like has indicated the need for temperature correction.

Graphical presentation of the combustion characteristic

Figure 7:
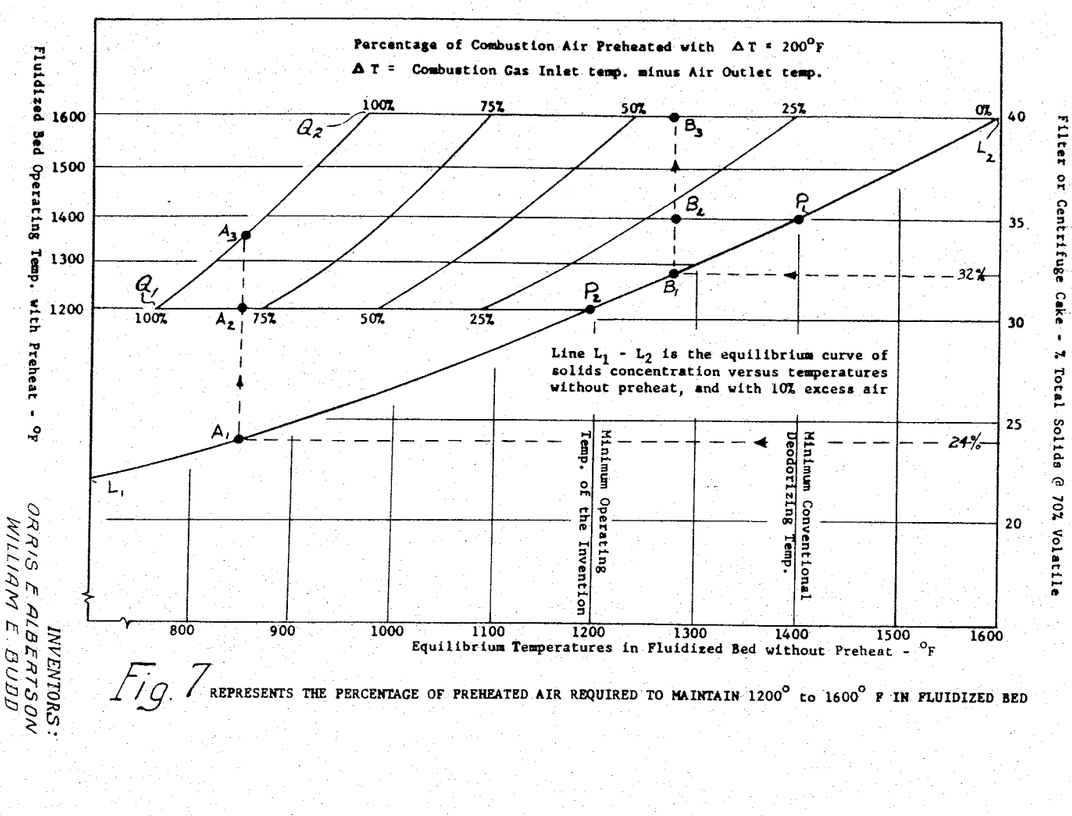
FIG. 7 is a graph illustrating the combustion control operation by temperature control in terms of the percentages of preheated combustion air required for various combustion temperatures and various sludge moisture conditions at an average content in volatile matter.

Following is the discussion of the operating curves in FIG. 7, illustrating graphically the use of air-preheating for the purpose of maintaining the desired combustion temperatures in the fluidized bed.

This graph presents for various feed sludge concentrations the extent of air-preheating necessary in order to maintain a certain combustion temperature such as will ensure complete non-odorous combustion in the fluidized bed. In this instance, the preheater operates at a temperature differential $\Delta T=200°$ F. between the temperature of the combustion gases entering the preheater and the temperature of the preheated air leaving the preheater.

This graph has as a basis the "combustion equilibrium" defined as the temperature to which the mixture of evaporated moisture and combustion gases is raised by the self-sustained combustion of the sludge, also termed the autogenous combustion temperature. The graph, therefore, is based upon the combustion equilibrium curve $L_1-L_2$ plotted for a certain sludge with solids concentrations on the right hand ordinate vs. the corresponding autogenous combustion temperatures on the abscissa attained without the addition of external heat.

As previously indicated, in practicing the invention a practical temperature operating range lies between 1200° F. and 1600° F. Thus, while the minimum combustion temperature for conventional incineration units is about 1400° F., in the practice of this invention a minimum temperature of about 1200° F. will suffice for attaining complete and odorless combustion of moist sludge in the fluidized bed. Several reasons offered in explanation of this phenomenon are that the high heat content of the inert material in the bed would cause explosion like flash evaporation of the moisture, while uniform heat distribution throughout the bed prevents incomplete combustion as in a zone of lower temperature. Moreover, the inert material in turbulent motion would cause comminution of the volatile matter into smaller and smaller particles favoring rapid combustion, and ash removal along with the burned gases.

The example of the equilibrium curve $L_1-L_2$ in FIG. 7 represents the combustion characteristics of a sludge having the following elemental composition:

EXAMPLE

A raw primary sludge, having 70% volatile matter in the total solids, has the following elemental composition:

| | Percent |
|---|---|
| C | 68.0 |
| H | 9.5 |
| O | 18.6 |
| N | 3.0 |
| S | 0.9 |

The heat value of the above composition by standard thermal determination is:

| | B.t.u./lb. |
|---|---|
| Total solids | 7,350 |
| Volatile solids | 10,500 |

The combustion air required by the above composition is:

8 lbs. of air/lb. total solids, including 10% excess air to ensure complete combustion.

The above elemental analysis and heat value constitute the basis from which the corresponding equilibrium curve $L_1-L_2$ for this sludge can be plotted point by point by determining for each combustion temperature the coordinate solids concentration necessary to produce autogenous combustion.

Determination of point $P_1$ of equilibrium curve (FIG. 7)

With VS—Volatile Solids and TS—Total Solids
Combustion temperature: 1400° F.
Heat input:
  0.7 lb. VS=7350 B.t.u. sice 1.0 lb. TS at 70% Volatile=0.7 lb. VS.
  8/0 lb. combustion air=120 B.t.u. (heat content in air supply).

| Heat output: | B.t.u. |
|---|---|
| 0.7 lb. VS (Heat contained in the combustion gases) | 3850 |
| X lb. $H_2O$ (Heat of water vaporization) | Y |
| 4% radiation | 300 |
| | 4150+Y |

Since input equals output,
Y=7470−4150
Y=3320 B.t.u. left for vaporizing and superheating the water,
X=3320, since 1770 B.t.u. required for heating 1 lb. H₂O to 1400° F., $$\overline{1770}$$

or

X=1.87 lb. H₂O is present with each lb. of Total Solids in the Sludge, so that the Total Solids Concentration is:

$$TS = \frac{1.00}{1.00+1.87} \times 100 = \frac{1}{2.87} \times 100$$

$$TS = 35\%$$

Thus, point $P_1$ on curve $L_1$–$L_2$ represents autogenous combustion at 1400° F. and 35% Total Solids Concentration in the feed to the combustion unit.

Similarly, one may establish point $P_2$ representing a combustion temperature of 1200° F. with a coordinated Total Solids concentration of 30.3%.

Referring again to FIG. 7, all practical operating conditions that require preheating of the combustion air because of inadequate solids concentration in the feed, are representable by points located within the enclosed area $L_2$, $P_2$, $Q_1$, $Q_2$, for a sludge such as the one above identified and with the preheater operating at the aforementioned temperature differential $T=200°$ F.

The practical significance of this "Preheat Area" in the chart of FIG. 7 is substantiated by the following examples:

Assuming the total solids concentration in a sludge of the above stated composition to be about 32%, autogenous combination would result at an operating temperature of about 1270° F. as represented by point $B_1$ on the equilibrium line of the graph. However, if a higher operating temperature should be desired, for instance in the order of 1400° F., then preheating of about 22% of the combustion air would be required, and that condition is represented by point $B_2$ located vertically above point $B_1$ in the graph. Similarly, the aforementioned upper limit temperature of about 1600° F. attainable by preheating 45% of the combustion air corresponding to the point $B_3$ located vertically above point $B_2$ in the graph. In this manner any desired operating temperature in the preheat area is attainable.

By contrast, in cases where the moisture content is too great for even attaining the minimum temperature of 1200° F. by way of autogenous combustion, preheating of a substantial portion of the combustion air is necessary for attaining at least that minimum temperature. Thus, for example where the total solids concentration is in the order of 24% as indicated by point $A_1$ located on the equilibrium curve $L_1$–$L_2$, the preheating of about 80% of the combustion air is necessary according to the graph for establishing an operating temperature of 1200° F. as the lower limit. Similarly, preheating of 100% of the combustion air would be required in order to attain an operating temperature of about 1360° F. according to location of point $A_3$ in the graph representative of the upper temperature limit attainable under these conditions without the addition of supplemental fuel.

We claim:

1. An apparatus for the disposal of sewage, over 50% of the solids of which are organic material, by combustion, comprising in combination
a combustion chamber;
an air permeable support in said combustion chamber;
a permanent body of hot inert granular material of substantial depth on said support, said inert granular material having substantial heat storing and heat radiating capacity;
means for maintaining said body at a temperature above 1200° F. to destroy odors and below 1800° F. to avoid heat losses and clinkers;
a source of combustion air under pressure arranged to pass air under pressure above atmospheric upwardly through said support at a velocity sufficient to fluidize said body and render it turbulent and to strip ash material therefrom;
sedimentation equipment for subjecting raw sewage to sedimentation to produce sludge;
continuous flow mechanical dewatering devices receiving sludge from said sedimentation equipment and acting on said sludge to increase the solids content thereof to over 20% but less than 50% to form a wet cake;
conduit means communicating with the interior of said combustion chamber,
the outlet end of said conduit means being disposed at a position within the lower half of said body but spaced above said support; and
means for continuously compacting and extruding said wet cake, substantially at said solids content and without intermediate drying, and feeding the compacted and extruded wet cake through said conduit means into said body when said body is fluidized, said means for compacting, extruding and feeding comprising
a tubular casing, and
a rotary feed screw operatively disposed in said casing,
one end of said casing being constructed and arranged to receive said wet cake, and the other end of said casing having a restricted outlet opening of a transverse dimension smaller than the internal diameter of said casing at the other end thereof,
said screw tapering from a relatively large cake receiving portion located in said one end of said casing to a smaller cake extruding portion at said other end of said casing,
the action of said body of inert granular material, when at said temperature and fluidized, causing the compacted and extruded cake which issues from said conduit means to be completely dried, comminuted and dispersed within said body, with at least the major portion of the organic material of the cake being burned within said fluidized body and with the resulting ash being stripped from the fluidized body and carried upwardly therefrom with the combustion gases.

2. In a sewage disposal system, the combination of
a combustion chamber having air permeable support means therein;
a permanent fluidizable body of inert granular material supported in said chamber by said support means, said granular material having heat storing and heat radiating characteristics;
means connected to said chamber and operatively arranged to pass air upwardly through said support means at a veloocity sufficient to fluidize said body, whereby said body is rendered turbulent and ash material, when present, is stripped upwardly therefrom;
sedimentation equipment for subjecting raw sewage to sedimentation to produce sewage sludge;
sludge handling means comprising
continuous flow mechanical detwatering means arranged to receive said sludge and dewater the same to a total waste solids content of 20–50%, of which solids content over 50% is organic material, and to deliver the dewatered sludge in the form of a wet cake material, and
compacting and feeding means arranged to receive said cake material, to compact the same into a cohesive heterogeneous continuously flowing mass having said total waste solids content, and to force said compacted mass into said fluidized body in sealed relation against the escape of gases therefrom and to a point below the surface thereof; and means operatively connected to said chamber and arranged to introduce fuel and burn said fuel at least to bring said body of granular material to an operative temperature, the introduction and burning of said fuel and the passage of air upwardly through said support means as said compacted cake material is within said body of granular material allowing said body to attain and remain at a temperature in the range of 1200–1800° F., the action of said fluidized body at said temperature being effective to disintegrate said compacted cake material, dry the disintegrated material, and effect at least the major proportion of the complete combustion of said organic material while said cake material remains within said fluidized body, and strip the resulting ash from said body.

3. A sewage disposal system according to claim 2, wherein:

said continuous flow mechanical dewatering means comprises a solid bowl pressurized centrifuge, and said centrifuge and said compacting and feeding means are so constructed and arranged as to fully enclose the sludge during dewatering thereof and the wet cake during compacting and feeding thereof until the same is within said fluidized body.

4. A sewage disposal system according to claim 2, wherein means for compacting and feeding the cake comprises a cylindrical casing receiving the cake at one end and having a restricted outlet opening at the other end of less diameter than the casing and a rotating screw in said casing.

5. A sewage disposal system according to claim 4, wherein said screw is tapered from a relatively large cake receiving screw portion to a smaller cake extruding portion.

References Cited
UNITED STATES PATENTS

| | | | |
|---|---|---|---|
| 954,855 | 4/1910 | Decarie | 110—8 X |
| 1,892,681 | 1/1933 | Rankin | 110—8 |
| 2,171,535 | 9/1939 | Berg et al. | 110—8 |
| 2,246,224 | 6/1941 | Streander | 210—2 |
| 2,433,864 | 1/1948 | Pattee | 237—7 X |
| 2,650,084 | 8/1953 | White | 263—21 X |
| 2,774,661 | 12/1956 | White | 263—21 X |
| 2,789,034 | 4/1957 | Swaine et al. | 23—177 |
| 2,817,498 | 12/1957 | Miller | 110—56 X |
| 2,850,449 | 9/1958 | Torpey | 210—10 |
| 3,034,571 | 5/1962 | Matthews | 110—18 X |
| 3,049,300 | 8/1962 | Lewis et al. | 236—15 |
| 3,099,495 | 6/1963 | Pondorf | 302—50 |

FREDERICK L. MATTESON, Jr., *Primary Examiner.*

H. B. RAMEY, *Assistant Examiner.*

Disclaimer and Dedication 3,351,030.—*Orris E. Albertson*, Norwalk, and *William E. Budd*, Ridgefield, Conn. TREATMENT AND INCINERATION OF WASTE SLUDGES. Patent dated Nov. 7, 1967. Disclaimer and dedication filed Sept. 27, 1968, by the assignee, *Dorr-Oliver Incorporated*.

Hereby disclaims and dedicates to the Public the terminal portion of the term of the patent subsequent to May 15, 1984.

[*Official Gazette January 28, 1969.*]